2 Sheets—Sheet 1.

W. DUNLAP.
Spring-Perch for Vehicles.

No. 214,896. Patented April 29, 1879.

WITNESSES:
Saml. J. Van Stavoren
A. Connolly

INVENTOR,
William Dunlap,
By Connolly Bros.,
ATTORNEYS.

N. PETERS, PHOTO-LITHOGRAPHER, WASHINGTON, D. C.

2 Sheets—Sheet 2.

W. DUNLAP.
Spring-Perch for Vehicles.

No. 214,896. Patented April 29, 1879.

WITNESSES:
Saml. J. VanStavoren
A. Connolly

INVENTOR,
William Dunlap,
By Connolly Bro. ATTORNEYS.

N. PETERS, PHOTO-LITHOGRAPHER, WASHINGTON, D. C.

UNITED STATES PATENT OFFICE.

WILLIAM DUNLAP, OF PHILADELPHIA, PENNSYLVANIA, ASSIGNOR OF ONE-FOURTH HIS RIGHT TO HENRY MORRIS, OF SAME PLACE.

IMPROVEMENT IN SPRING-PERCHES FOR VEHICLES.

Specification forming part of Letters Patent No. 214,896, dated April 29, 1879; application filed March 26, 1879.

*To all whom it may concern:*

Be it known that I, WILLIAM DUNLAP, of Philadelphia, in the county of Philadelphia and State of Pennsylvania, have invented a certain new and useful Spring-Perch for Vehicles; and I do hereby declare the following to be a full, clear, and exact description of the invention, such as will enable others skilled in the art to which it pertains to make and use it, reference being had to the accompanying drawings, which form part of this specification, in which—

Figure 1:
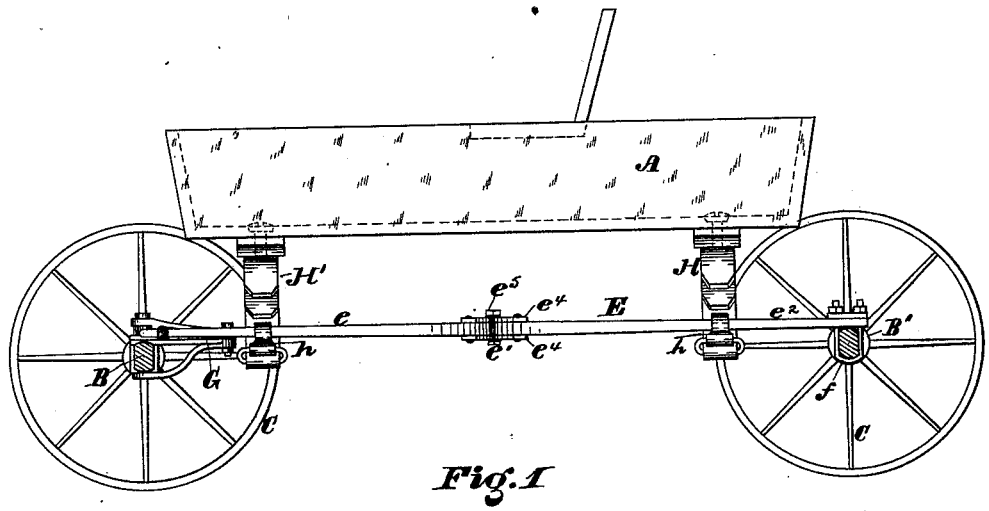
Figure 2:
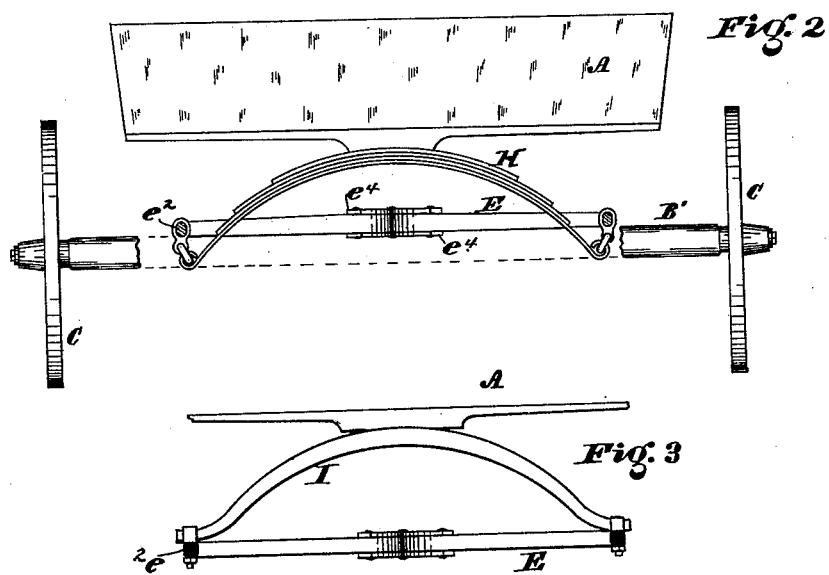
Figure 3:
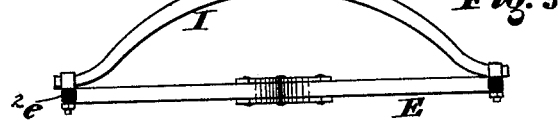
Figure 4:
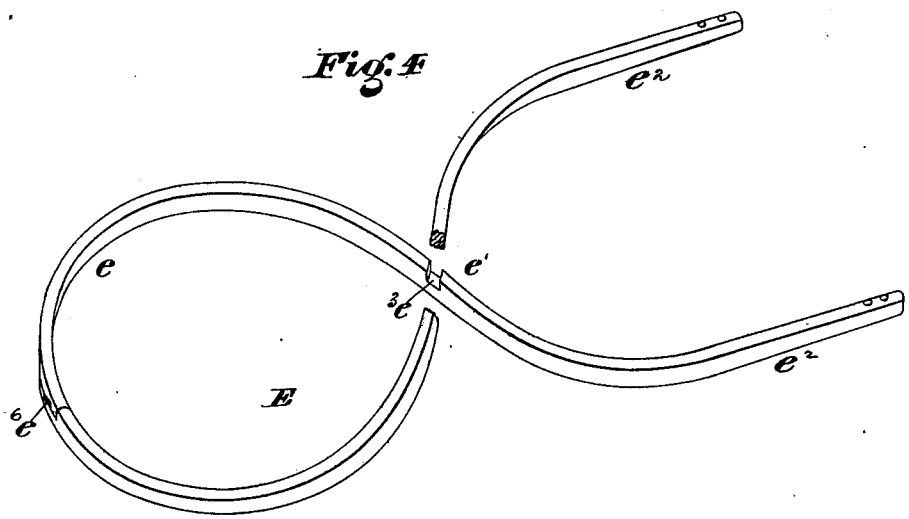
Figure 5:
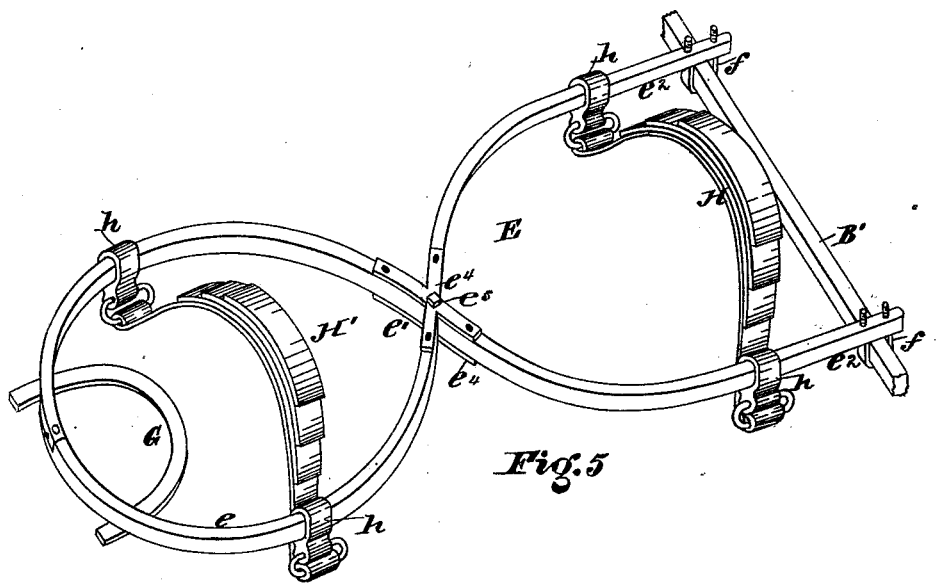

Figure 1 is a side elevation of a vehicle, partly in section, with my improved perch applied thereto. Fig. 2 is an end view of the same. Fig. 3 is an end view of the perch, showing the rigid bar for connecting said perch to the vehicle. Fig. 4 is a perspective of the perch. Fig. 5 is a perspective of the same and elliptical springs applied thereto, which connect said perch with the vehicle; and Fig. 6, detail view, showing the splice in the forward end of the perch and the dovetail key for the same.

My invention has for its object to provide a perch for carriages and other vehicles which shall act as a spring, thereby dispensing with the employment of bearing-springs, or, if the latter be used, assisting their action, so as to cause such vehicles to ride more easily and softly than heretofore; and my invention consists in the novel construction hereinafter described and claimed.

Referring to the accompanying drawings, A indicates the body, B B' the front and rear axles, and C C the wheels, of a carriage or other vehicle, constructed in the usual or any suitable manner. E is the perch, which constitutes, essentially, my improvement. Said perch consists of a bar of any suitable spring material, preferably wood, bent to the shape shown, having its front portion forming a loop or circle, $e$, its sides crossing or intersecting at $e^1$, and its two ends, $e^2$ $e^2$, extending backwardly to the rear axle, B'. Said ends $e^2$ are connected to said axle by clips $f\ f$, while the forward portion of the loop $e$ is fastened in a similar manner to the upper circle of the fifth-wheel G.

Where the sides of the perch cross at $e^1$ they may be formed with notches $e^3$, fitted to one another, and secured by stay-plates $e^4$ and a center-bolt, $e^5$, as shown in Fig. 1; or, if preferred, no joint need be formed at the intersection of said sides, and they may be left free to slide upon one another.

Figure 6:
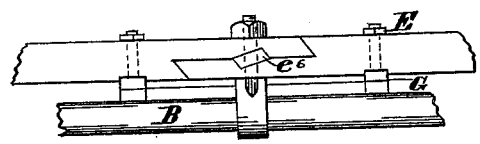

The perch E may be formed in one continuous piece, either of wood or metal; but if the former material be employed I prefer to make it in two pieces, "halved" or spliced in front, and provided with a dovetailed key, $e^6$, as shown plainly in Fig. 6.

If metal be used to form the perch, it may be either a solid bar or a series of leaves or plates made up as a bearing-spring is, but shaped to conform to the outline illustrated, and operating in the manner described.

H H' represent bearing-springs, connecting the body A with the perch E, having their ends secured to the latter by clips $h\ h$.

For buggies and other like pleasure-vehicles I prefer to use such springs in connection with my spring-perch; but in some styles of vehicles said bearing-springs may be dispensed with, and the connection between the body and the perch be effected by means of rigid bars I I, as shown in Fig. 3.

Some of the advantages of the foregoing construction are as follows: The peculiar form and construction of the perch give it a spring action, and in many forms of vehicles will permit bearing-springs to be dispensed with, and yet allow said vehicles to have an elastic or resilient movement to their bodies, the same as if supported on bearing-springs. Where bearing-springs are used with it the resilient action of said springs will be added to that of the perch, hence causing vehicles so provided to ride more softly and comfortably than those having stiff perches.

If desired, the ends of the perch may be connected with the rear axle through the medium of springs or bars, in lieu of clips, to cause the body of the vehicle to rest lower than it does in the arrangement shown and described.

What I claim as my invention is—

1. A spring-perch for vehicles, constructed as described, forming a loop, $e$, its sides crossing or intersecting at $e^1$, substantially as shown and described.

2. The spring-perch E, crossed upon itself at $e^1$, and notched and fastened at said intersection, substantially as shown and described.

In testimony that I claim the foregoing I have hereunto set my hand this 21st day of March, 1879.

WILLIAM DUNLAP.

Witnesses:
M. D. CONNOLLY,
W. H. DUNLAP.